United States Patent
Kumar et al.

(10) Patent No.: US 12,373,202 B2
(45) Date of Patent: Jul. 29, 2025

(54) UPGRADE MANAGEMENT BASED ON UPGRADE SCORES

(71) Applicant: SAP SE, Walldorf (DE)

(72) Inventors: Mukesh Kumar, Bangalore (IN); Narasimhan Balasubramanian, Bangalore (IN); Tara Reapy, Galway (IE); Chandan Potukuchi, Bangalore (IN)

(73) Assignee: SAP SE, Walldorf (DE)

( * ) Notice: Subject to any disclaimer, the term of this patent is extended or adjusted under 35 U.S.C. 154(b) by 221 days.

(21) Appl. No.: 18/112,768

(22) Filed: Feb. 22, 2023

(65) Prior Publication Data

US 2024/0281237 A1    Aug. 22, 2024

(51) Int. Cl.

| | |
|---|---|
| *G06F 8/00* | (2018.01) |
| *G06F 3/0482* | (2013.01) |
| *G06F 8/65* | (2018.01) |
| *G06F 8/77* | (2018.01) |
| *G06F 11/3668* | (2025.01) |
| *G06F 11/30* | (2006.01) |
| *G06V 10/74* | (2022.01) |

(52) U.S. Cl.
CPC .............. *G06F 8/77* (2013.01); *G06F 3/0482* (2013.01); *G06F 8/00* (2013.01); *G06F 8/65* (2013.01); *G06F 11/3688* (2013.01); *G06F 11/3051* (2013.01); *G06F 11/3676* (2013.01); *G06V 10/761* (2022.01)

(58) Field of Classification Search
CPC . G06F 8/77; G06F 8/65; G06F 3/0482; G06F 11/3051; G06F 11/3688; G06F 11/3676; G06F 8/00; G06V 10/761
See application file for complete search history.

(56) References Cited

U.S. PATENT DOCUMENTS

| | | | |
|---|---|---|---|
| 2019/0294525 A1* | 9/2019 | Scheiner | G06F 11/3676 |
| 2022/0270176 A1* | 8/2022 | Chintakindi | G06F 3/0482 |
| 2023/0108313 A1* | 4/2023 | Larson | G06V 10/761 382/159 |
| 2023/0359449 A1* | 11/2023 | Agrawal | G06F 11/3051 |
| 2024/0095027 A1* | 3/2024 | Fanning | G06F 8/77 |

* cited by examiner

*Primary Examiner* — Tuan A Vu
(74) *Attorney, Agent, or Firm* — Mintz Levin Cohn Ferris Glovsky and Popeo, P.C.

(57) ABSTRACT

A method, a system, and computer program product for managing upgrades of cloud-based software applications are provided. A compatibility of planned changes to a cloud-based software application with a cloud-based system hosting the application is determined. An inclusion of a past mitigation in the planned changes to the cloud-based software application is verified. A test of the one or more planned changes to the cloud-based software application is executed. Modified planned changes to the cloud-based software application are generated based on a result of the test. An upgrade score of the modified planned changes to the cloud-based software application is determined and used for managing a deployment, to a productive system, of the modified planned changes to the cloud-based software application.

18 Claims, 6 Drawing Sheets

| Issue Details 222 | Area 224 | Issue Category 226 | No. of Incidents 228 | Impact Level 230 | Impact Details 232 | Escalated? 234 |
|---|---|---|---|---|---|---|
| Migration Workbench: Internal Server Error (missing meta data) when using migration tool | FND | Migration Workbench | 20 | High | Impact high because not caught during the test upgrade phase. This issue was a regression. | Yes |
| Horizon Theme: New UI theme caused a wide range of issues for customers | UX | Horizon | 19 | Low | Background/ Design color not working. | No |
| Adoption for HTML5 update A new update was added to SAPUI5 which caused issues | UI | Update Adoption | 5 | Medium | UI Issues in 360 Browser – special browser used in China, we did not have the test environment. | No |

*FIG. 2B*

| Proposal 242 | Group 244 | Details 246 | Team 248 | Starting Time 250 |
|---|---|---|---|---|
| Take all aspects of application feature into consideration | New Feature Development | Have to be very careful when we do any changes with respect to roadmap topics, ensure that we wrap around the application feature. | All | 22/11 |
| Introduce new test cases for User Interface | User Interface | Ensure the browser 360 is included in new UI changes Changes made for Horizon Theme should be compatible with past versions | UI | 22/11 |
| Extensive Testing is required for future adoption of New Architecture of Output Management | Output Management | Documentation Guidelines to be updated religiously Increase the amount of manual testing to address variety of use cases | All | 24/11 |

UPGRADE MANAGEMENT BASED ON UPGRADE SCORES

TECHNICAL FIELD

The present disclosure generally relates to cloud computing and, more specifically, to quantifying upgrade quality using upgrade scores to manage subsequent upgrades.

BACKGROUND

An application can be hosted by a cloud platform such that the application can be remotely accessible to multiple tenants, for example, over the Internet. For example, the application can be available as a cloud-based service including, for example, a software as a service (SaaS) and/or the like. Many organizations can rely on such cloud-based software applications including, for example, enterprise resource planning (ERP) software, customer relationship management (CRM) software, and/or the like. Software applications periodically require updates and/or upgrades to ensure their operability, compatibility with other applications, as well as ability to withstand malicious attacks. A lot of times, some features of such updates/upgrades can be inconvenient to the user, raising unpredictable issues.

SUMMARY

Methods, systems, and articles of manufacture, including computer program products, are provided for managing upgrades of cloud computing systems. In one aspect, a computer-implemented method includes: determining, by one or more processors, a compatibility of one or more planned changes to a cloud-based software application with a cloud-based system hosting the cloud-based software application, verifying, by the one or more processors, an inclusion of a past mitigation in the one or more planned changes to the cloud-based software application, executing, by the one or more processors, a test of the one or more planned changes to the cloud-based software application, generating, by the one or more processors, one or more modified planned changes to the cloud-based software application, the one or more modified planned changes including a modification of one or more features of the one or more planned changes to the cloud-based software application based on a result of the test, and determining, by the one or more processors, an upgrade score of the one or more modified planned changes to the cloud-based software application, the upgrade score being used for managing a deployment, to a productive system, of the one or more modified planned changes to the cloud-based software application.

In some variations, one or more features disclosed herein including the following features can optionally be included in any feasible combination. In some implementations, the computer-implemented method further includes: identifying, by the one or more processors, dependencies between the cloud-based system and the cloud-based software application. The computer-implemented method further includes: verifying, by the one or more processors, avoidance of reoccurrence of past issues associated with past versions of the cloud-based software application. The test of the one or more planned changes to the cloud-based software application is performed based on a collaboration between a testing system and a development system. The computer-implemented method further includes: comparing, by the one or more processors, the upgrade score of the one or more modified planned changes to the cloud-based software application to past upgrade scores associated with past versions of the cloud-based software application. The upgrade score of the one or more modified planned changes to the cloud-based software application includes a weighted sum of a production score and a test score. The computer-implemented method further includes: determining, by the one or more processors, issues generated by the one or more modified planned changes to the cloud-based software application, determining, by the one or more processors, operation impact scores for the issues, and determining, by one or more processors, using the operation impact scores future planned changes to the cloud-based software application.

In another aspect, a non-transitory computer-readable storage medium includes programming code, which when executed by at least one data processor, causes operations including: determining a compatibility of one or more planned changes to a cloud-based software application with a cloud-based system hosting the cloud-based software application, verifying an inclusion of a past mitigation in the one or more planned changes to the cloud-based software application, executing a test of the one or more planned changes to the cloud-based software application, generating one or more modified planned changes to the cloud-based software application, the one or more modified planned changes including a modification of one or more features of the one or more planned changes to the cloud-based software application based on a result of the test, and determining an upgrade score of the one or more modified planned changes to the cloud-based software application, the upgrade score being used for managing a deployment, to a productive system, of the one or more modified planned changes to the cloud-based software application.

In some variations, one or more features disclosed herein including the following features can optionally be included in any feasible combination. In some implementations, the operations further include: identifying, by the one or more processors, dependencies between the cloud-based system and the cloud-based software application. In some implementations, the operations further include: verifying, by the one or more processors, avoidance of reoccurrence of past issues associated with past versions of the cloud-based software application. The test of the one or more planned changes to the cloud-based software application is performed based on a collaboration between a testing system and a development system. In some implementations, the operations further include: comparing, by the one or more processors, the upgrade score of the one or more modified planned changes to the cloud-based software application to past upgrade scores associated with past versions of the cloud-based software application. The upgrade score of the one or more modified planned changes to the cloud-based software application includes a weighted sum of a production score and a test score. In some implementations, the operations further include: determining, by the one or more processors, issues generated by the one or more modified planned changes to the cloud-based software application, determining, by the one or more processors, operation impact scores for the issues, and determining, by one or more processors, using the operation impact scores future planned changes to the cloud-based software application.

In another aspect, a system includes: at least one data processor; and at least one memory storing instructions, which when executed by the at least one data processor, cause operations including: determining a compatibility of one or more planned changes to a cloud-based software application with a cloud-based system hosting the cloud-based software application, verifying an inclusion of a past mitigation in the one or more planned changes to the cloud-based software application, executing a test of the one or more planned changes to the cloud-based software application, generating one or more modified planned changes to the cloud-based software application, the one or more modified planned changes including a modification of one or more features of the one or more planned changes to the cloud-based software application based on a result of the test, and determining an upgrade score of the one or more modified planned changes to the cloud-based software application, the upgrade score being used for managing a deployment, to a productive system, of the one or more modified planned changes to the cloud-based software application.

In some variations, one or more features disclosed herein including the following features can optionally be included in any feasible combination. In some implementations, the operations further include: identifying, by the one or more processors, dependencies between the cloud-based system and the cloud-based software application. In some implementations, the operations further include: verifying, by the one or more processors, avoidance of reoccurrence of past issues associated with past versions of the cloud-based software application. The test of the one or more planned changes to the cloud-based software application is performed based on a collaboration between a testing system and a development system. In some implementations, the operations further include: comparing, by the one or more processors, the upgrade score of the one or more modified planned changes to the cloud-based software application to past upgrade scores associated with past versions of the cloud-based software application. The upgrade score of the one or more modified planned changes to the cloud-based software application includes a weighted sum of a production score and a test score. In some implementations, the operations further include: determining, by the one or more processors, issues generated by the one or more modified planned changes to the cloud-based software application, determining, by the one or more processors, operation impact scores for the issues, and determining, by one or more processors, using the operation impact scores future planned changes to the cloud-based software application.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a non-transitory computer-readable or machine-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to customization of database tables, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2B depicts an example of an incident record, in accordance with some example implementations;

FIG. 2C depicts an example of a mitigation plan, in accordance with some example implementations;

Figure 1:
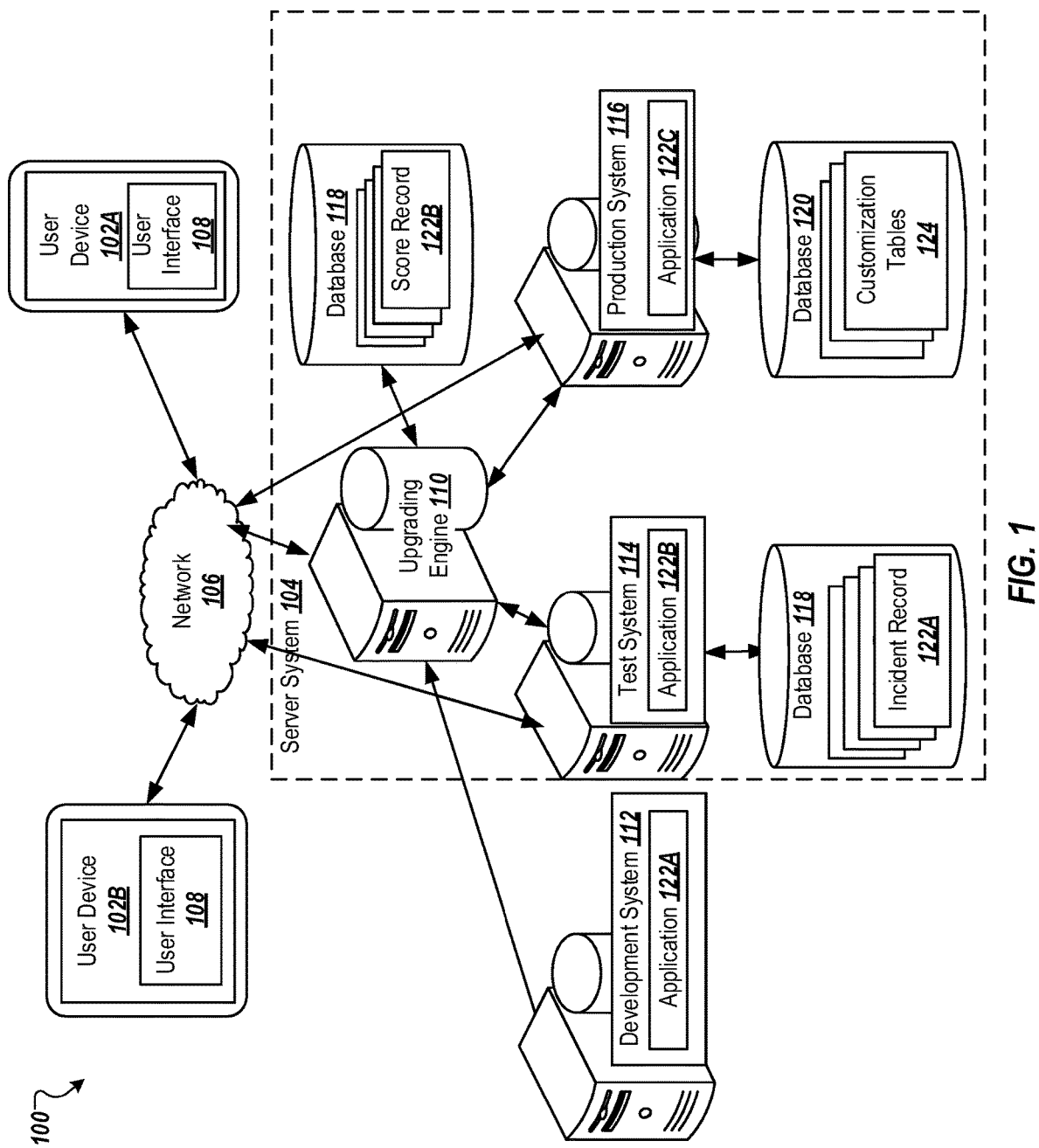
FIG. 1 depicts a diagram illustrating an example of a system, in accordance with some example implementations.

When practical, like labels are used to refer to same or similar items in the drawings.

DETAILED DESCRIPTION

Implementations of the present disclosure are generally directed to cloud-based software applications operating in cloud computing systems. More particularly, implementations of the present disclosure are directed to managing upgrades of cloud-based software applications using an upgrade score. The upgrade score can include two measures of the upgrades: a quality measure based on incident quantification and a feedback measure based on escalations post upgrade. The upgrade score can be used to manage upgrades, improving their quality. For example, when changes to a cloud-based software application are planned, a compatibility of the changes with a cloud-based system hosting the cloud-based software application is determined. For each new compatible upgrade, inclusion of a past mitigation of issues can be verified to avoid recurring issues with new upgrades of the cloud-based software application. The changes planned for a compatible upgrade free of recurring issues can be tested before a full release of the upgrade. The test results can be used to generate modified planned changes to the cloud-based software application. The modified planned changes can be used to determine an upgrade score of the modified planned changes to the cloud-based software application that is used for managing a deployment, to a production system, of the modified planned changes to the cloud-based software application.

Traditional upgrades of cloud-based software applications were often raising concerns for the customers due to multiple reasons. The development of cloud-based software applications was limited in encompassing all the possible scenario combinations customers could be using. Application upgrades including enhancements in expected areas of interest without complete testing due to knowledge gaps led to incompatibilities for the customer. In some cases, application upgrades also led to technical incompatibilities forcing customers to change their private add-on solutions, which could require new customization of database table settings, which can be very complex involving large computational resources. In addition, application upgrades could include regressions, such as missing double maintenance of code lines due to complexity of the landscape and schedule. Reintroduction of past mitigated issues or new issues with new upgrades, degraded the acceptance of new upgrades, leading to escalations and chaotic environment, which can disturb other processes of the cloud-based systems.

To avoid the drawbacks of traditional upgrades of cloud-based software applications described above, upgrade scores are used to manage deployment of upgraded cloud-based software applications to different environments. Using the described implementations herein, the upgrade scores are generated based on an objective assessment of the upgrade quality and based on feedback received from multiple environments affected by the upgrades during a set initial period of upgrade release. The feedback from different components of the cloud-based (e.g., ERP) system (e.g., development system, testing system, and production system) can increase the accuracy and overall reliability of the upgrade scores. The derived upgrade scores are made visible to all customers identified for using the upgrades of cloud-based software applications. The visibility of the upgrade scores, enables elimination of upgrade uncertainties, minimizing incidents and optimizing computational resources involved in mitigating upgrade issues.

FIG. 1 depicts an example of a system 100, in accordance with some example implementations. Referring to FIG. 1, the example system 100 includes user devices 102A, 102B, a server system 104, and a network 106. The user devices 102A, 102B can interact with the server system 104 to access cloud-based software applications that are upgraded repeatedly and to edit tenant-specific customizations to be stored, by the server system 104, as database tables used during execution of the cloud-based software application(s). The user interface 108 can enable an entry of a user input including the user authentication information, data associated to application upgrades, such as upgrade feedback, upgrade issue identification, table (e.g., table name and table version) selection, and table modification (customization) for use in association with cloud-based software applications.

The user devices 102A, 102B can be and/or include any type of processor and memory based device, such as, for example, cellular phones, smart phones, tablet computers, laptop computers, desktop computers, workstations, personal digital assistants (PDA), network appliances, cameras, enhanced general packet radio service (EGPRS) mobile phones, media players, navigation devices, email devices, game consoles, or an appropriate combination of any two or more of these devices or other data processing devices. Even though, not illustrated, in some implementations, multiple user devices 102 including different computing system configurations, such as different operating systems, different processing capabilities, different hardware components, and/or other differences can concurrently request services, from the server system 104. The user devices 102A, 102B can include any combination of fixed and variable computing components.

As shown in FIG. 1, the user devices 102A, 102B can be communicatively coupled, via the network 106, with the server system 104 during an authenticated session to enable data transmission for accessing and using cloud-based software applications. It should be appreciated that the network 106 can be any wired and/or wireless network including, for example, a public land mobile network (PLMN), a local area network (LAN), a wide area network (WAN), the Internet, a cellular network, a telephone network (e.g., PSTN) or an appropriate combination thereof connecting any number of communication devices, mobile computing devices, fixed computing devices, server systems, and/or the like.

The server system 104 can include any form of servers including, but not limited to a web server (e.g., cloud-based server), an application server, a proxy server, a network server, and/or a server pool. In general, the server system 104 uses an upgrading engine 110 to manage upgrades of cloud-based software applications throughout multiple systems, including a test system 114, and a production system 116. The server system 104 can be configured to provide access to cloud-based software applications and customization services for the cloud-based software applications to any number of user devices (e.g., the user devices 102A, 102B) over the network 106. For example, the upgrading engine 110 can communicate with a development system 112 to manage modifications of the cloud-based software applications. In addition to the upgrading engine 110 and systems 114, 116, the server system 104 can include databases 118, 120.

The database 118 can be configured to store upgrade records including incident records 122A and score records 122B. The database 120 can include a multitenant database architecture (e.g., multitenant database containers (MDC)), such that each tenant of the server system 104 (using a respective user devices 102A, 102B) can customize respective tables 124 stored by the database 120 and can be served by separate instances of the server system 104 when using cloud-based software applications.

The databases 118, 120 can include a cloud database system environment, such as, Analytics Cloud (SAC) Data Warehouse Cloud or High performance Analytic Appliance (HANA), as available from SAP AG, Walldorf, Germany although other types of databases can be used as well. In some implementations, the databases 118, 120 can include an on-premise database system (e.g., system databases, tenant databases, etc.), servers (e.g., name server(s), index server(s), script server(s), etc.). The databases 118, 120 can store upgrade records 122A, 122B and multiple tables 124, respectively that can be accessible (e.g., via queries, procedure calls, etc.) by the upgrading engine 110, by the user devices 102A, 102B, and by cloud-based software applications 122A, 122B, 122C. The database 120 can include a runtime database that holds most recent database tables 124 and respective branch numbers to enable customization of application settings according to tenant preferences.

As shown in FIG. 1, the server system 104 can host the upgrading engine 110 to manage upgrades of a cloud-based software application 122A, 122B, 122C that is executed by the development system 112, and tested by the test system 114, before being released to the production system 116 in a development mode, a testing mode, and a production mode, respectively. For instance, the cloud-based software application 122A, 122B, 122C can be an enterprise resource planning (ERP) software application or a customer relationship management (CRM) software application. It should be appreciated that the cloud-based software application 122A, 122B, 122C can be any cloud-based software application. For example, the cloud-based software application 122A, 122B, 122C can be any cloud-based software application providing a variety of data processing functionalities including, for example, payroll, time and attendance management, recruiting and onboarding, learning and development, performance and compensation, workforce planning, and/or the like.

In some example implementations, the cloud-based software application 122A, 122B, 122C can operate on data stored in one or more database tables 124. For example, the cloud-based software application 122A, 122B, 122C can store, retrieve, update, and/or delete data from one or more database tables 124. In some implementations, the cloud-based software application 122A, 122B, 122C can be modified based on incident records 122A and score records 122B stored in the database 118.

As shown in FIG. 1, the cloud-based software application 122A, 122B, 122C can be adjusted based on incident records 122A and score records 122B and can operate on data in a table 124 stored in the databases 118, 120, respectively. The cloud-based software application 122A, 122B, 122C can undergo multiple upgrade sessions, each associated with respective incident records 122A and a score record 122B stored in the database 118. The upgrading engine 110 can process data extracted from the incident records 122A, score records 122B, data received from the systems 114, 116, and data received from the user devices 102A, 120B to manage an upgrade of the application 122A, 122B, 122C and generate a respective score for the application 122C released to the production system 116. The management of the upgrade process is further described in detail with reference to FIGS. 2 and 3.

Figure 2A:
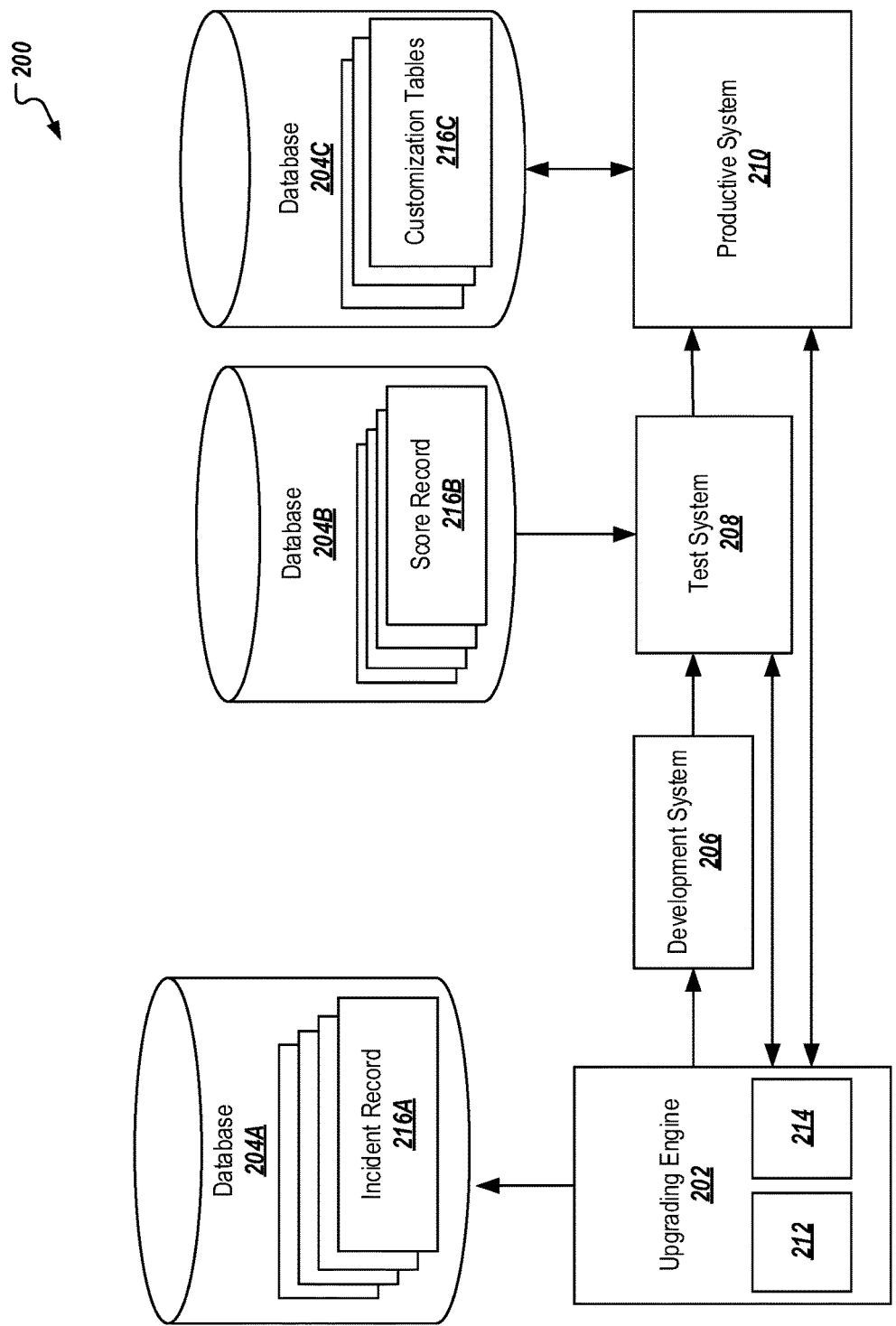
FIG. 2A depicts an example of a system architecture, in accordance with some example implementations.

FIG. 2 depicts a block diagram illustrating an example of an upgrade management system 200, in accordance with some example implementations. The upgrade management system 200 can be integrated in one or more server systems, such as server system 104 described with reference to FIG. 1. The upgrade management system 200 can include a upgrading engine 202 (e.g., upgrading engine 110 described with reference to FIG. 1), a database 204A, B, C (e.g., databases 118, 120 described with reference to FIG. 1), a development system 206 (e.g., development system 112 described with reference to FIG. 1), a test system 208 (e.g., test system 114 described with reference to FIG. 1), and a production system 210 (e.g., production system 116 described with reference to FIG. 1).

In some example implementations, the upgrading engine 202 can include an upgrade controller 212 and a score engine 214. The upgrade controller 212 can be configured to generate a new version of a cloud-based software application including changes relative to an existing cloud-based software application using application customization tables 216C (e.g., table 124 described with reference to FIG. 1). In some implementations, the upgrading engine 202 can include a trigger configured to automatically initiate an upgrading process based on incidents and issues included in the incident record 216A, an example of which is illustrated in FIG. 2B. The upgrade trigger of the upgrading engine 202 can be further configured to alert the development system 206 when a new version of the cloud-based software application is planned to be generated. The alert can include an application identifier, thereby enabling a mitigation plan (an example of which is illustrated in FIG. 2C) used to generate the new version of the application or the changes to the application corresponding to the upgraded version to be propagated to the test system 208 and to the productive system 210.

In response to receiving a request to generate a new version of the application including changes to an existent older version of the application associated with a cloud-based system hosting the cloud-based software application, the upgrade controller 212 can execute an analysis of past issues stored in the incident record (e.g., incident record 220 illustrated in FIG. 2B) to assist the development system 206 to generate a mitigation plan (e.g., mitigation plan 240 illustrated in FIG. 2C) including planned application changes. The incident analysis can be based on a classification of incidents relative to affected area(s), issue category, number of incidents, impact ranking and impact details. The upgrade controller 212 can determine a compatibility of the changes with a cloud-based system hosting the cloud-based software application. For each new compatible upgrade, the upgrade controller 212 can verify inclusion of a past mitigation of issues to avoid recurring issues with new upgrades of the cloud-based software application. The testing system 208 can test changes planned for a compatible upgrade free of recurring issues before a full release of the upgrade to the productive system. The test results can be used to generate modified planned changes to the cloud-based software application. The modified planned changes can be used to determine an upgrade score of the modified planned changes to the cloud-based software application that is used for managing a deployment, to a productive system, of the modified planned changes to the cloud-based software application. The upgrade score can be stored in the score record 216B and can be compared to past scores corresponding to older versions of the application. Further details regarding the process performed by the upgrade management system 200 are described with reference to FIG. 3.

FIG. 2B illustrates an example of an incident record 220. The example incident record 220 includes issue details 222, area(s) affected by issues 224, issue category 226, a number of incidents 228, an impact level 230, impact details 232 and escalation status 234. The issue details 222 can include an issue title that can be automatically generated and an issue description including details referring to the issue. The area affected by issues 224 can include an identifier (name or name acronym) of a system component of the test environment and/or the production environment affected by respective issues. The issue category 226 can include an identifier of a function affected by the issue. The number of incidents 228 can include a numeral corresponding to a total number of associated issues. The impact level 230 can include a textual or numerical ranking identifier (e.g., "low" or "0", "medium or "1" and "high or "2") of an estimated impact of the issue on the customers and the system. The impact details 232 can include a textual description including details referring to the issue impact. The escalation status 234 can include a binary identifier of the escalation decision related to the issue.

FIG. 2C illustrates an example of a mitigation plan 240. The mitigation plan 240 includes a proposal 242, a group identifier 244, details 246, a team identifier 248, and a starting time 250. The mitigation plan 240 can be structured as a set of actions for mitigating multiple issues. The proposal 242 can include a proposal plan for mitigating a particular issue. The group identifier 244 can include an identifier of a group of functions affected by the issue being addressed. The details 246 can include a textual description including details referring to the issue mitigation plan. The team identifier 248 can include a textual or numerical team identifier (e.g., all test team or UI). The starting time 250 can include a date for initiating the mitigation plan.

Figure 3:
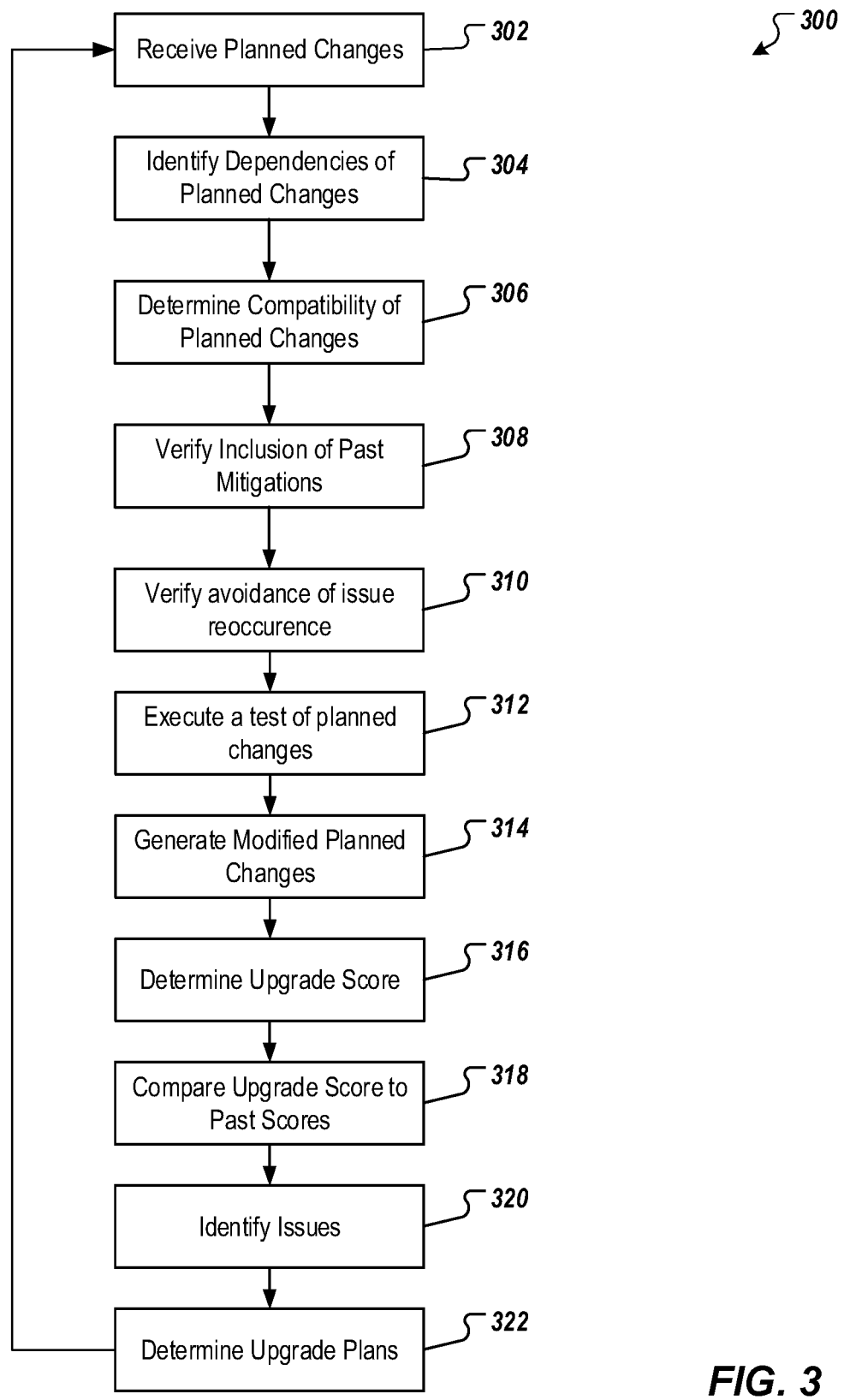
FIG. 3 depicts a process for customizing database tables, in accordance with some example implementations.

FIG. 3 depicts a flowchart illustrating a process 300 for managing upgrades of cloud-based software applications in accordance with some example implementations. The process 300 can be executed by the system 100 shown in FIG. 1, using the upgrade management system 200 shown in FIG. 2, the system 400 shown in FIG. 4 or any combination thereof.

At 302, planned changes to a cloud-based software application with a cloud-based system hosting the cloud-based software application are received. The planned changes can define an upgrade of the cloud-based software application. The planned changes can affect a function of the application, such as the way data is stored in a database table that can include one or more customizations specific to a tenant associated with the cloud-based system. In some implementations, at least a portion of the changes can be automatically identified based on an analysis of one or more prior versions of the application. The planned changes can be included in a mitigation plan (e.g., mitigation plan 240 described with reference to FIG. 2C).

At 304, dependencies between the cloud-based system and the cloud-based software application are identified. The dependencies between a portion of the features (components of the cloud-based system associated with the cloud-based software application, functions of the cloud-based software application, and data types processed and generated by the cloud-based software application) of the application that are dependent on each other are selected based on one or more dependency selection rules. The selection of a limited portion of the features (instead of all features) of the cloud-based software application increasing the dependency analysis processing speed. The dependency selection rules can include a filter based on implemented changes, an impact of the function dependencies, a priority ranking associated with the features, and an issue frequency associated with the features. In some implementations, higher ranking is associated with prioritized correction activities, wherein upgrade issues are prioritized to prevent reappearance in the production system.

At 306, a compatibility between the planned changes to the cloud-based software application and the cloud-based system hosting the cloud-based software application is determined. For example, the selected dependencies are used to analyze if the cloud-based system supports the upgraded application relative to the function changes using compatibility rules. The compatibility rules can define allowed application feature changes. The compatibility rules can be used to verify a change applied to the cloud-based software application to enable a model-consistent solution that can be based on multiple parameters including data type, extension types, sub-function links, and others. For example, the compatibility rules can indicate permission to increase data types and prohibit a decrease in data type. Within the context example of data type compatibility rules, the data generated or processed by the cloud-based software application can be changed from character (with a set maximum length) to string (with an increased maximum length, including the previous data type with the set maximum length).

At 308, an inclusion of a past mitigation in the planned changes to the cloud-based software application is verified to ensure that the past mitigation proposals are taken into account and to ensure double maintenance of previous solutions. For example, if past issues indicated the use of an application extension that triggers incompatibilities with particular application features, newly added features are verified to avoid incompatibilities with the application extension.

At 310, an avoidance of reoccurrence of past issues associated with past versions of the cloud-based software application is verified to ensure that past issues are not reintroduced with new upgrades. For example, records of past issues are processed to be adapted to the newly added application features and test conditions for verifying avoidance of reoccurrence of past issues associated with past versions of the cloud-based software application are generated.

At 312, a test of the planned changes to the cloud-based software application is executed and testing results are generated. The test of the planned changes can include a stringent test including performance testing, security testing, and usability testing. In some implementations, the test can include a special upgrade test phase. The testing of the upgraded application can include collaborative testing performed by development and testing teams. In some implementations, testing can include tests performed by partners/customers accessing the application through the productive environment, to test during a set period for testing application upgrades. In some implementations, tests can be performed daily by partners/customers accessing the application through the productive environment, and development and testing teams can get immediate notifications about the issues to optimize issue identification in an initial phase of upgrade release to the productive system and timely mitigation plan implementation.

At 314, the testing results can be used to generate modified planned changes. The modified planned changes can include a modification of one or more features (components of the cloud-based system associated with the cloud-based software application, functions of the cloud-based software application, and data types processed and generated by the cloud-based software application) of the application based on a test result. The modified planned changes can be tested using a stringent test until the test results indicate that the upgraded application successfully passes a set number (percentage) of tests (having a performance equal or higher than previous versions of the application, security is maintained, and application usability is preserved relative to all functions of the application). The feedback received from the partners/customers accessing the application through the productive environment can be used to fix issues quickly and to ensure that issues do not repeat during productive upgrade. In some implementations, mitigation plans are adjusted to actively avoid escalations, by identifying past issues that were associated with escalations and prioritizing implementations of solutions for these issues.

At 316, an upgrade score of the modified planned changes to the cloud-based software application is determined. The upgrade score includes a weighted sum of a production score and a test score. The production score can be based on the number or incidents raised by the modified planned changes to the cloud-based software application, the respective impact of the issues relative to the tenant of the issue source (test or production environment). The test score can be based on customer escalation after upgrade release to the production environment. The test score can be adjusted based on a customer ranking associated with a customer generating the issue escalation. In some implementations, the quality score can have a numerical value that can range within a set interval (e.g., from 0 to 10), where values above the middle of the interval (e.g., 5) are considered positive values and the values below the middle of the interval are considered as being critically low. For example, to determine the upgrade score of the modified planned changes to the cloud-based software application the incidents raised are collected and classified based on the impact category. The number of incidents is multiplied with the weights as per impact and the weighted values are summed to generate the score using the following formula: Score=MAX(0,x*10−(Production Score+Test Score/2)/x, where x is an integer (e.g., 256).

For example, a customer can generate multiple notifications related to identified issues (incidents), as shown in Table 1.

TABLE 1

| Number of Incidents in Productive tenant | Impact | Weight | Score |
|---|---|---|---|
| 6 | Low | 1 | 6 × 1 = 6 |
| 8 | Medium | 2 | 8 × 2 = 16 |
| 4 | High | 4 | 4 × 4 = 16 |
| 1 | Very High | 16 | 1 × 16 = 15 |
| 1 | Disaster | 256 | 1 × 256 = 256 |
| Sub Total | | | 310 |

The score can be adjusted to reflect is an upgrade is positive, negative or neutral based on an escalation raised by customers in response to identification of issues, relative to the customer's criticality ranking, as shown in the example illustrated in Table 2.

TABLE 2

| Customer Identifier | Criticality Rank | Percentile | Escalated |
|---|---|---|---|
| 1747568 | 13 | 99 | Yes |
| 7854567 | 511 | 78 | Yes |
| 8876785 | 308 | 87 | Yes |
| 6562594 | 115 | 95 | Yes |
| Sub Total | | 3.59 | |

At 318, the score is compared to past scores corresponding to older versions of the application to determine a score trend (whether the score increased or decreased). In some implementations, the comparison includes a comparison of features that affected the score changes. The score can be transmitted to user devices to be displayed on graphical user interfaces as graphs (including score trends illustrating multiple score values) and/or highlights or color codes (green for good scores and red for bad scores) of the current (and past) scores. In some implementations, a score comparison indicating an increased score and a good score can be used to trigger a full release of the upgraded application to a production system (e.g., making the upgraded application available to all customers rather than a limited number of customers selected for testing). A bad score can be indicative of a particular number of issues that appear in an application version that are identified for being addressed in a subsequent version.

At 320, issues related to upgrades are collected over a set period of time (e.g., during the entire time the upgrade is in production environment) or according to a production testing schedule. At 322, upgrade plans are determined for a subsequent upgrade of the application and process 300 returns to 302.

The example process 300 enables a computationally efficient switch from one version of the database table to a newer or older version of the database table, without requiring any of the development system, the test system, and/or the productive system to be unavailable, the switch being dictated by the use of the corresponding version number (branch number) of the database table. Using the example process 300, different components of the cloud-based (e.g., ERP) system (e.g., development system, testing system, and production system) can read the new database tables, from the database, identifying them using the branch number. The direct access to the new database tables from the database, enables elimination of new database table replication, minimizing storage resources, and optimizing computational resources involved in customization of database table settings.

Figure 4:
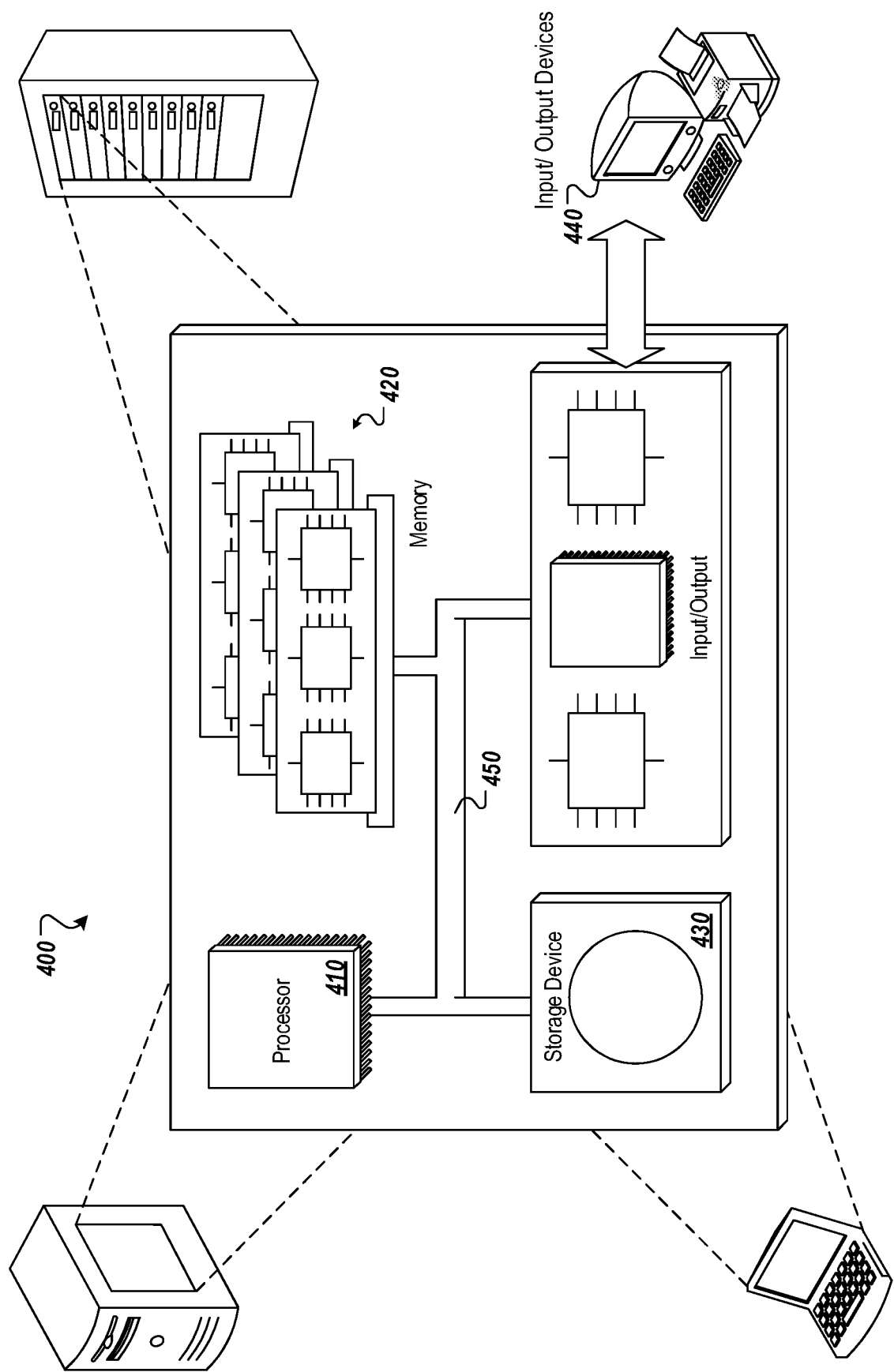
FIG. 4 depicts a diagram illustrating a computing system, in accordance with some example implementations.

In some implementations, the current subject matter can be configured to be implemented in a system 400, as shown in FIG. 4. The system 400 can include a processor 410, a memory 420, a storage device 430, and an input/output device 440. Each of the components 410, 420, 430 and 440 can be interconnected using a system bus 450. The processor 410 can be configured to process instructions for execution within the system 400. In some implementations, the processor 410 can be a single-threaded processor. In alternate implementations, the processor 410 can be a multi-threaded processor. The processor 410 can be further configured to process instructions stored in the memory 420 or on the storage device 430, including receiving or sending information through the input/output device 440. The memory 420 can store information within the system 400. In some implementations, the memory 420 can be a computer-readable medium. In alternate implementations, the memory 420 can be a volatile memory unit. In yet some implementations, the memory 420 can be a non-volatile memory unit. The storage device 430 can be capable of providing mass storage for the system 400. In some implementations, the storage device 430 can be a computer-readable medium. In alternate implementations, the storage device 430 can be a floppy disk device, a hard disk device, an optical disk device, a tape device, non-volatile solid state memory, or any other type of storage device. The input/output device 440 can be configured to provide input/output operations for the system 400. In some implementations, the input/output device 440 can include a keyboard and/or pointing device. In alternate implementations, the input/output device 440 can include a display unit for displaying graphical user interfaces.

In some implementations, one or more application function libraries in the plurality of application function libraries can be stored in the one or more tables as binary large objects. Further, a structured query language can be used to query the storage location storing the application function library.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more user device computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include user devices and servers. A user device and server are generally, but not exclusively, remote from each other and typically interact through a communication network. The relationship of user device and server arises by virtue of computer programs running on the respective computers and having a user device-server relationship to each other.

Further non-limiting aspects or implementations are set forth in the following numbered examples:

Example 1: A computer-implemented method comprising: determining, by one or more processors, a compatibility of one or more planned changes to a cloud-based software application with a cloud-based system hosting the cloud-based software application; verifying, by the one or more processors, an inclusion of a past mitigation in the one or more planned changes to the cloud-based software application; executing, by the one or more processors, a test of the one or more planned changes to the cloud-based software application; generating, by the one or more processors, one or more modified planned changes to the cloud-based software application, the one or more modified planned changes comprising a modification of one or more features of the one or more planned changes to the cloud-based software application based on a result of the test; and determining, by the one or more processors, an upgrade score of the one or more modified planned changes to the cloud-based software application, the upgrade score being used for managing a deployment, to a productive system, of the one or more modified planned changes to the cloud-based software application.

Example 2: The computer-implemented method of example 1, further comprising: identifying, by the one or more processors, dependencies between the cloud-based system and the cloud-based software application.

Example 3: The computer-implemented method of any one of the preceding examples, further comprising: verifying, by the one or more processors, avoidance of reoccurrence of past issues associated with past versions of the cloud-based software application.

Example 4: The computer-implemented method of any one of the preceding examples, wherein the test of the one or more planned changes to the cloud-based software application is performed based on a collaboration between a testing system and a development system.

Example 5: The computer-implemented method of any one of the preceding examples, further comprising: comparing, by the one or more processors, the upgrade score of the one or more modified planned changes to the cloud-based software application to past upgrade scores associated with past versions of the cloud-based software application.

Example 6: The computer-implemented method of any one of the preceding examples, wherein the upgrade score of the one or more modified planned changes to the cloud-based software application comprises a weighted sum of a production score and a test score.

Example 7: The computer-implemented method of any one of the preceding examples, further comprising: determining, by the one or more processors, issues generated by the one or more modified planned changes to the cloud-based software application; determining, by the one or more processors, operation impact scores for the issues; and determining, by one or more processors, using the operation impact scores future planned changes to the cloud-based software application.

Example 8: A non-transitory computer-readable storage medium comprising programming code, which when executed by at least one data processor, causes operations comprising: determining a compatibility of one or more planned changes to a cloud-based software application with a cloud-based system hosting the cloud-based software application; verifying an inclusion of a past mitigation in the one or more planned changes to the cloud-based software application; executing a test of the one or more planned changes to the cloud-based software application; generating one or more modified planned changes to the cloud-based software application, the one or more modified planned changes comprising a modification of one or more features of the one or more planned changes to the cloud-based software application based on a result of the test; and determining an upgrade score of the one or more modified planned changes to the cloud-based software application, the upgrade score being used for managing a deployment, to a productive system, of the one or more modified planned changes to the cloud-based software application.

Example 9: The non-transitory computer-readable storage medium of example 8, further comprising: identifying dependencies between the cloud-based system and the cloud-based software application.

Example 10: The non-transitory computer-readable storage medium of any one of the preceding examples, further comprising: verifying avoidance of reoccurrence of past issues associated with past versions of the cloud-based software application.

Example 11: The non-transitory computer-readable storage medium of any one of the preceding example, wherein the test of the one or more planned changes to the cloud-based software application is performed based on a collaboration between a testing system and a development system.

Example 12: The non-transitory computer-readable storage medium of any one of the preceding examples, further comprising: comparing the upgrade score of the one or more modified planned changes to the cloud-based software application to past upgrade scores associated with past versions of the cloud-based software application.

Example 13: The non-transitory computer-readable storage medium of any one of the preceding examples, wherein the upgrade score of the one or more modified planned changes to the cloud-based software application comprises a weighted sum of a production score and a test score.

Example 14: The non-transitory computer-readable storage medium of any one of the preceding examples, further comprising: determining issues generated by the one or more modified planned changes to the cloud-based software application; determining operation impact scores for the issues; and determining, by one or more processors, using the operation impact scores future planned changes to the cloud-based software application.

Example 15: A system comprising: at least one data processor; and at least one memory storing instructions, which when executed by the at least one data processor, cause operations comprising: determining a compatibility of one or more planned changes to a cloud-based software application with a cloud-based system hosting the cloud-based software application; verifying an inclusion of a past mitigation in the one or more planned changes to the cloud-based software application; executing a test of the one or more planned changes to the cloud-based software application; generating one or more modified planned changes to the cloud-based software application, the one or more modified planned changes comprising a modification of one or more features of the one or more planned changes to the cloud-based software application based on a result of the test; and determining an upgrade score of the one or more modified planned changes to the cloud-based software application, the upgrade score being used for managing a deployment, to a productive system, of the one or more modified planned changes to the cloud-based software application.

Example 16: The system of example 15, further comprising: identifying dependencies between the cloud-based system and the cloud-based software application.

Example 17: The system of any one of the preceding examples, further comprising: verifying avoidance of reoccurrence of past issues associated with past versions of the cloud-based software application.

Example 18: The system of any one of the preceding examples, wherein the test of the one or more planned changes to the cloud-based software application is performed based on a collaboration between a testing system and a development system.

Example 19: The system of any one of the preceding examples, further comprising: comparing the upgrade score of the one or more modified planned changes to the cloud-based software application to past upgrade scores associated with past versions of the cloud-based software application, wherein the upgrade score of the one or more modified planned changes to the cloud-based software application comprises a weighted sum of a production score and a test score.

Example 20: The system of any one of the preceding examples, further comprising: determining issues generated by the one or more modified planned changes to the cloud-based software application; determining operation impact scores for the issues; and determining, by one or more processors, using the operation impact scores future planned changes to the cloud-based software application.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. For example, the logic flows can include different and/or additional operations than shown without departing from the scope of the present disclosure. One or more operations of the logic flows can be repeated and/or omitted without departing from the scope of the present disclosure. Other implementations can be within the scope of the following claims.

What is claimed is:

1. A computer-implemented method comprising:
   determining, by one or more processors, a compatibility of one or more planned changes to a cloud-based software application with a cloud-based system hosting the cloud-based software application;
   verifying, by the one or more processors, an inclusion of a past mitigation in the one or more planned changes to the cloud-based software application;

executing, by the one or more processors, a test of the one or more planned changes to the cloud-based software application;

generating, by the one or more processors, one or more modified planned changes to the cloud-based software application, the one or more modified planned changes comprising a modification of one or more features of the one or more planned changes to the cloud-based software application based on a result of the test; and determining, by the one or more processors, an upgrade score of the one or more modified planned changes to the cloud-based software application, wherein the upgrade score of the one or more modified planned changes to the cloud-based software application comprises a weighted sum of a production score and a test score, the upgrade score causing deployment, to a production system, of the one or more modified planned changes to the cloud-based software application, wherein the production score is based on a number of incidents raised by the one or more modified planned changes to the cloud-based software application, wherein a respective impact of each incident is relative to a source of the incident, wherein the test score is based on an escalation after upgrade release to the production system, and wherein the test score is adjusted based on a customer ranking associated with a customer generating the escalation.

2. The computer-implemented method of claim 1, further comprising:
identifying, by the one or more processors, dependencies between the cloud-based system and the cloud-based software application.

3. The computer-implemented method of claim 1, further comprising:
verifying, by the one or more processors, avoidance of reoccurrence of past issues associated with past versions of the cloud-based software application.

4. The computer-implemented method of claim 3, wherein the test of the one or more planned changes to the cloud-based software application is performed based on a collaboration between a testing system and a development system.

5. The computer-implemented method of claim 1, further comprising:
comparing, by the one or more processors, the upgrade score of the one or more modified planned changes to the cloud-based software application to past upgrade scores associated with past versions of the cloud-based software application.

6. The computer-implemented method of claim 1, further comprising:
determining, by the one or more processors, issues generated by the one or more modified planned changes to the cloud-based software application;
determining, by the one or more processors, operation impact scores for the issues; and
determining, by the one or more processors, using the operation impact scores future planned changes to the cloud-based software application.

7. A non-transitory computer-readable storage medium comprising programming code, which when executed by at least one data processor, causes operations comprising:
determining a compatibility of one or more planned changes to a cloud-based software application with a cloud-based system hosting the cloud-based software application;

verifying an inclusion of a past mitigation in the one or more planned changes to the cloud-based software application;

executing a test of the one or more planned changes to the cloud-based software application;

generating one or more modified planned changes to the cloud-based software application, the one or more modified planned changes comprising a modification of one or more features of the one or more planned changes to the cloud-based software application based on a result of the test; and determining an upgrade score of the one or more modified planned changes to the cloud-based software application, wherein the upgrade score of the one or more modified planned changes to the cloud-based software application comprises a weighted sum of a production score and a test score, the upgrade score causing deployment, to a production system, of the one or more modified planned changes to the cloud-based software application, wherein the production score is based on a number of incidents raised by the one or more modified planned changes to the cloud-based software application, wherein a respective impact of each incident is relative to a source of the incident, wherein the test score is based on an escalation after upgrade release to the production system, and wherein the test score is adjusted based on a customer ranking associated with a customer generating the escalation.

8. The non-transitory computer-readable storage medium of claim 7, further comprising:
identifying dependencies between the cloud-based system and the cloud-based software application.

9. The non-transitory computer-readable storage medium of claim 7, further comprising:
verifying avoidance of reoccurrence of past issues associated with past versions of the cloud-based software application.

10. The non-transitory computer-readable storage medium of claim 9, wherein the test of the one or more planned changes to the cloud-based software application is performed based on a collaboration between a testing system and a development system.

11. The non-transitory computer-readable storage medium of claim 7, further comprising:
comparing the upgrade score of the one or more modified planned changes to the cloud-based software application to past upgrade scores associated with past versions of the cloud-based software application.

12. The non-transitory computer-readable storage medium of claim 7, further comprising:
determining issues generated by the one or more modified planned changes to the cloud-based software application;
determining operation impact scores for the issues; and
determining, by the at least one data processor, using the operation impact scores future planned changes to the cloud-based software application.

13. A system comprising:
at least one data processor; and
at least one memory storing instructions, which when executed by the at least one data processor, cause operations comprising:
determining a compatibility of one or more planned changes to a cloud-based software application with a cloud-based system hosting the cloud-based software application;

verifying an inclusion of a past mitigation in the one or more planned changes to the cloud-based software application;

executing a test of the one or more planned changes to the cloud-based software application;

generating one or more modified planned changes to the cloud-based software application, the one or more modified planned changes comprising a modification of one or more features of the one or more planned changes to the cloud-based software application based on a result of the test; and determining an upgrade score of the one or more modified planned changes to the cloud-based software application, wherein the upgrade score of the one or more modified planned changes to the cloud-based software application comprises a weighted sum of a production score and a test score, the upgrade score causing deployment, to a production system, of the one or more modified planned changes to the cloud-based software application wherein the production score is based on a number of incidents raised by the one or more modified planned changes to the cloud-based software application, wherein a respective impact of each incident is relative to a source of the incident, wherein the test score is based on an escalation after upgrade release to the production system, and wherein the test score is adjusted based on a customer ranking associated with a customer generating the escalation.

14. The system of claim 13, further comprising:
identifying dependencies between the cloud-based system and the cloud-based software application.

15. The system of claim 13, further comprising:
verifying avoidance of reoccurrence of past issues associated with past versions of the cloud-based software application.

16. The system of claim 15, wherein the test of the one or more planned changes to the cloud-based software application is performed based on a collaboration between a testing system and a development system.

17. The system of claim 13, further comprising:
comparing the upgrade score of the one or more modified planned changes to the cloud-based software application to past upgrade scores associated with past versions of the cloud-based software application.

18. The system of claim 13, further comprising:
determining issues generated by the one or more modified planned changes to the cloud-based software application;

determining operation impact scores for the issues; and determining, by the at least one data processor, using the operation impact scores future planned changes to the cloud-based software application.

* * * * *